(12) United States Patent
Hong et al.

(10) Patent No.: US 10,970,235 B2
(45) Date of Patent: Apr. 6, 2021

(54) COMPUTING SYSTEM WITH A NONVOLATILE STORAGE AND OPERATING METHOD THEREOF

(71) Applicant: SAMSUNG ELECTRONICS CO., LTD., Suwon-si (KR)

(72) Inventors: JuHyung Hong, Yongin-si (KR); Eui-Young Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/709,112

(22) Filed: Sep. 19, 2017

(65) Prior Publication Data
US 2018/0107614 A1    Apr. 19, 2018

(30) Foreign Application Priority Data
Oct. 19, 2016  (KR) .................. 10-2016-0136007

(51) Int. Cl.
| | | |
|---|---|---|
| *G06F 13/16* | (2006.01) | |
| *G06F 9/38* | (2018.01) | |
| *G06F 12/06* | (2006.01) | |
| *G06F 13/40* | (2006.01) | |
| *G06F 13/42* | (2006.01) | |
| *G06F 12/0868* | (2016.01) | |

(52) U.S. Cl.
CPC ........ *G06F 13/1642* (2013.01); *G06F 9/3814* (2013.01); *G06F 12/063* (2013.01); *G06F 12/0868* (2013.01); *G06F 13/4059* (2013.01); *G06F 13/1673* (2013.01); *G06F 13/4221* (2013.01); *G06F 2212/1024* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,127,059 B1 * | 2/2012 | Carr ...................... | G06F 13/387 710/74 |
| 8,316,109 B2 | 11/2012 | Freimuth et al. | |
| 8,407,407 B1 | 3/2013 | Adler et al. | |
| 8,527,693 B2 | 9/2013 | Flynn et al. | |
| 8,553,466 B2 | 10/2013 | Han et al. | |

(Continued)

OTHER PUBLICATIONS

Jeroen Dorgelo et al., "Host Memory Buffer (HMB) based SSD System", Flash Memory Summit 2015, Aug. 13, 2015, (16 pages total).

(Continued)

*Primary Examiner* — Henry Tsai
*Assistant Examiner* — Christopher A Bartels
(74) *Attorney, Agent, or Firm* — Sughrue Mion, PLLC (57) ABSTRACT

An operating method of a computing system includes storing, in a submission queue, a command entry corresponding to a request for one of input and output; fetching the command entry from the submission queue, moving data corresponding to the request within a host memory that is under control of a storage device; after moving the data, updating a completion status of the request in a completion queue; and after updating the completion queue, transferring the data between the host memory and the storage device.

19 Claims, 12 Drawing Sheets

(56) References Cited

U.S. PATENT DOCUMENTS

| | | | |
|---|---|---|---|
| 8,559,235 | B2 | 10/2013 | Yoon et al. |
| 8,654,587 | B2 | 2/2014 | Yoon et al. |
| 9,563,382 | B2 | 2/2017 | Hahn et al. |
| 9,672,180 | B1* | 6/2017 | Morshed ............. G06F 12/0811 |
| 2002/0133646 | A1* | 9/2002 | Cheung ................ G06F 13/385 |
| | | | 710/22 |
| 2004/0148460 | A1* | 7/2004 | Steinmetz ............ G06F 3/0607 |
| | | | 711/114 |
| 2006/0041702 | A1* | 2/2006 | Greenberger ........ G06F 3/0614 |
| | | | 710/306 |
| 2006/0174048 | A1* | 8/2006 | Ohara .................... G06F 13/28 |
| | | | 710/305 |
| 2008/0162811 | A1* | 7/2008 | Steinmetz .......... G06F 13/4234 |
| | | | 711/114 |
| 2008/0244120 | A1* | 10/2008 | Park ..................... G06F 13/385 |
| | | | 710/65 |
| 2009/0103362 | A1* | 4/2009 | Pekny ................... G06F 3/0679 |
| | | | 365/185.04 |
| 2009/0121271 | A1 | 5/2009 | Son et al. |
| 2009/0137318 | A1* | 5/2009 | Russo ................. G06F 13/4291 |
| | | | 463/40 |
| 2011/0167134 | A1 | 7/2011 | Freimuth et al. |
| 2011/0216603 | A1 | 9/2011 | Han et al. |
| 2011/0233648 | A1 | 9/2011 | Seol et al. |
| 2012/0051143 | A1 | 3/2012 | Yoon et al. |
| 2012/0151118 | A1 | 6/2012 | Flynn et al. |
| 2012/0324147 | A1* | 12/2012 | Lai ..................... G06F 13/4291 |
| | | | 711/103 |
| 2013/0279262 | A1 | 10/2013 | Yoon et al. |
| 2013/0325998 | A1* | 12/2013 | Hormuth ........... G06F 15/17331 |
| | | | 709/212 |
| 2014/0149607 | A1* | 5/2014 | Shim ..................... G06F 3/0659 |
| | | | 710/5 |
| 2015/0006767 | A1* | 1/2015 | Lu ........................ G06F 13/382 |
| | | | 710/22 |
| 2015/0281126 | A1* | 10/2015 | Regula ............... G06F 13/4022 |
| | | | 709/212 |
| 2016/0011790 | A1 | 1/2016 | Rostoker et al. |
| 2016/0026388 | A1 | 1/2016 | Jeong et al. |
| 2016/0026406 | A1 | 1/2016 | Hahn et al. |
| 2016/0127493 | A1 | 5/2016 | Shalom et al. |
| 2016/0162416 | A1 | 6/2016 | Boyd et al. |
| 2016/0203091 | A1* | 7/2016 | Lee ....................... G06F 3/0658 |
| | | | 710/105 |
| 2016/0267016 | A1* | 9/2016 | Lee ............................ G06F 3/06 |
| 2017/0039162 | A1* | 2/2017 | Mishra ............... G06F 13/4282 |
| 2017/0149920 | A1* | 5/2017 | Sammatshetti ..... H04L 67/2842 |
| 2017/0220499 | A1* | 8/2017 | Gray ....................... G06F 13/36 |
| 2018/0018101 | A1* | 1/2018 | Benisty ................ G06F 3/0608 |
| 2018/0024949 | A1* | 1/2018 | Nimmagadda ....... G06F 3/0656 |
| | | | 710/105 |
| 2018/0039541 | A1* | 2/2018 | Hahn .................. G06F 11/1076 |
| 2018/0107614 | A1* | 4/2018 | Hong .................... G06F 9/3814 |
| 2019/0163396 | A1* | 5/2019 | Jo ......................... G06F 3/0656 |
| 2019/0278485 | A1* | 9/2019 | Benisty .............. G06F 13/4295 |

OTHER PUBLICATIONS

Tom Lenny, "NVM Express™: Unlock the Potential", Shannon Systems, 2014, p. 3-91, (91 pages total).

Juhyung Hong et al., "A RAM cache approach using Host Memory Buffer of the NVMe interface", ISOCC 2016, Sep. 19, 2016, (2 pages total).

* cited by examiner

COMPUTING SYSTEM WITH A NONVOLATILE STORAGE AND OPERATING METHOD THEREOF

CROSS-REFERENCE TO RELATED APPLICATION

This application claims priority from Korean Patent Application No. 10-2016-0136007, filed Oct. 19, 2016, in the Korean Intellectual Property Office, the entire contents of which are hereby incorporated by reference.

BACKGROUND

1. Field

Apparatuses and methods consistent with exemplary embodiments relate to a computing system and an operating method thereof.

2. Description of the Related Art

A solid-state drive (SSD) is implemented with a high-speed interface connected with a host, a central processing unit (CPU) controlling operations of storing and retrieving data, a nonvolatile memory (NVM) in which data are stored, a buffer memory used as a data buffer. An SSD may take advantage of new technologies such as a peripheral component interconnect express (PCIe) technology. Also, since an advanced host controller interface (AHCI) technology originally designed for a hard disk drive (HDD) is unable to take full advantage of all benefits of the SSD using the NVM, a new technology called NVM Express (NVMe) interface has been introduced.

One of the promises of the NVMe as a new storage technology is replacing the AHCI interface, which was designed in an era of HDD. In the case of a queue that is pointed out as a typical limit, the AHCI supports 32 instructions per queue while the NVMe supports 64,000 instructions per queue. That is, since a maximum queue depth is improved by 2,000 times, the performance of a system may be markedly improved. Also, since the NVMe is capable of efficiently supporting multiple cores of the CPU, the NVMe has many benefits compared with a conventional host interface technology.

SUMMARY

One or more exemplary embodiments provide a computing system using a host memory as a data cache of a storage device and an operating method thereof.

According to an aspect of an exemplary embodiment, there is provided an operating method of a computing system including: storing, in a submission queue, a command entry corresponding to a request for one of input and output; fetching the command entry from the submission queue; moving data corresponding to the request within a host memory that is under control of a storage device; after moving the data, updating a completion status of the request in a completion queue; and after updating the completion queue, transferring the data between the host memory and the storage device.

According to another aspect of an exemplary embodiment, a computing system may include a host device including a host memory having a data array and a host memory buffer, and a storage device connected to the host device and including at least one nonvolatile memory device and a memory controller configured to control the at least one nonvolatile memory device. The host memory buffer may include a metadata area that stores metadata for managing the storage device, and a data cache area that temporarily stores data corresponding to a request for one of input and output. The storage device is configured to send, to the host device, a data movement request between the data array and the data cache area in response to the request.

According to another aspect of an exemplary embodiment, a method may include: receiving, at a host device including a host memory, a write command for storing data in a storage device connected to the host device; copying the data from a data array of the host memory to a host buffer memory of the host memory, wherein the host device has exclusive control over the host buffer memory; after copying the data from the data array to the host buffer memory, sending a completion notification from the storage device to the host device; and after sending the completion notification, copying the data from the host buffer memory to the storage device.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

References will now be made in detail to exemplary embodiments, with reference to the accompanying drawings.

Figure 1:
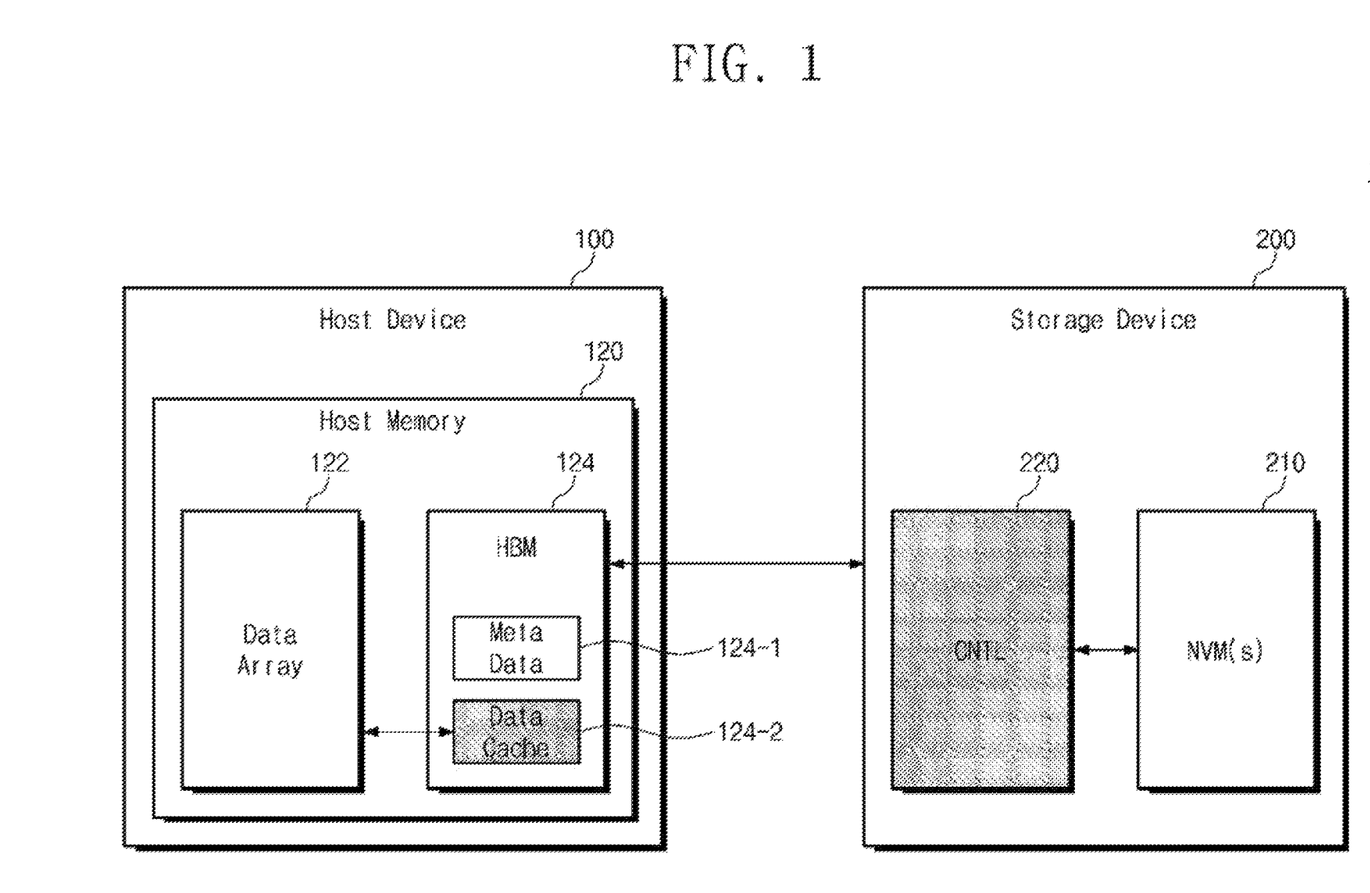
FIG. 1 is a diagram illustrating a computing system, according to an exemplary embodiment.

FIG. 1 is a diagram illustrating a computing system, according to an exemplary embodiment. Referring to FIG. 1, a computing system 10 may include a host device 100 and a storage device 200 storing data of the host device 100.

The host device 100 may include a host memory 120. The host memory 120 may include a data array area 122 and a host memory buffer (HBM) 124 used in the host device 100. Here, the host memory buffer 124 may be an area in which the storage device 200 independently uses a part of the host memory 120.

Also, the host memory buffer 124 may include a metadata area 124-1 needed to manage the storage device 200 and a data cache area 124-2 storing a cached data that performs a buffer memory function of the storage device 200.

The metadata may include a logical-to-physical (L2P) table. Here, the L2P table may include information associated with a physical address, which corresponds to a logical address, of a nonvolatile memory NVM in the storage device 200.

The storage device 200 may include at least one nonvolatile memory device (NVM(s)) 210 and a controller 220 that controls the nonvolatile memory device 210.

The nonvolatile memory device 210 may be implemented to store data. The nonvolatile memory device 210 may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), or the like.

Furthermore, the nonvolatile memory may be implemented to have a three-dimensional (3D) array structure. In some exemplary embodiments, a 3D memory array is provided. The 3D memory array is monolithically formed in one or more physical levels of arrays of memory cells having an active area disposed above a silicon substrate and circuitry associated with the operation of those memory cells. The circuit related to an operation of memory cells may be located in a substrate or on a substrate. The term "monolithic" means that layers of each level of the 3D array are directly deposited on top of the layers of each underlying level of the 3D array.

The 3D memory array includes vertical NAND strings that are vertically oriented such that at least one memory cell is located over another memory cell. The at least one memory cell may comprise a charge trap layer. Each vertical NAND string may include at least one selection transistor located over memory cells. At least one selection transistor may have the same structure as those of memory cells and may be monolithically formed together with memory cells.

The three-dimensional memory array is formed of a plurality of levels and has word lines or bit lines shared among levels. The following patent documents, which are hereby incorporated by reference, describe suitable configurations for three-dimensional memory arrays, in which the three-dimensional memory array is configured as a plurality of levels, which are applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an aspect of an exemplary embodiment may be applicable to a charge trap flash (CTF) in which an insulating layer is used as a charge storage layer, as well as a flash memory device in which a conductive floating gate is used as a charge storage layer.

The controller 220 may be implemented to control overall operations of the storage device 200 by using the metadata stored in the metadata area 124-1 of the host memory buffer 124. The controller 220 may include one or more processors and a memory for storing instructions (e.g., firmware) for controlling the nonvolatile memory device 210.

Also, the controller 220 may be implemented to temporarily store the associated data in the data cache area 124-2 of the host memory buffer 124 in response to an input/output request of the host device 100. For example, write data that are requested for writing by the host device 100 may be temporarily stored in the data cache area 124-2 of the host memory buffer 124. Also, read data that are requested for reading by the host device 100 may be read from the data cache area 124-2 of the host memory buffer 124.

In general, the NVMe specification may provide the host memory buffer 124 in which a storage device uses a partial area of the host memory 120 without interference of the host device. A related art using the HMB 124 stores logical-to-physical address mapping information. Input/output direct memory access (DMA) between a host device and a storage device is implemented such that only DMA between the host device and the storage device may be possible. However, in the case of the NVMe interface, the storage device is capable of directly accessing a memory area of the host device, and if the storage device can request a host memory copy and the host device can perform the DMA with slight modification in host driver and hardware (H/W), the HMB 124 may operate as a data buffer of the storage device while not violating the NVMe protocol.

Figure 2:
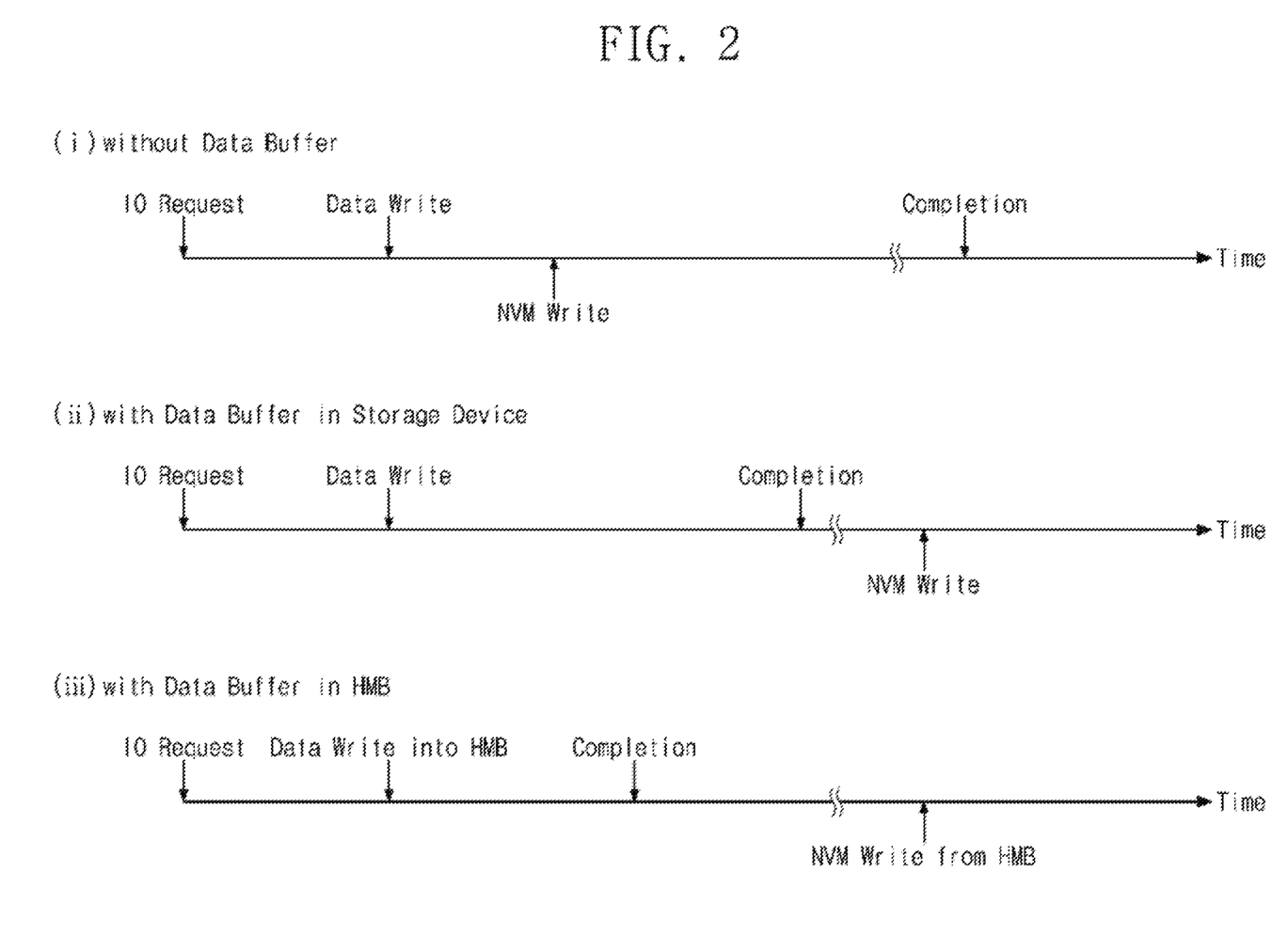
FIG. 2 is a diagram illustrating points in time when completion is made between a host device and a storage device during a write operation.

FIG. 2 is a diagram illustrating points in time when completion is made (e.g., a completion signal is issued) between a host device and a storage device during a write operation. A first case (i) illustrates a write operation that is performed when a data buffer does not exist between a host device and a storage device. A second case (ii) illustrates a write operation that is performed when the data buffer exists between the host device and the storage device. A third case (iii) illustrates a write operation that is performed when a data buffer in the HMB 124 exists between the host device and the storage device.

During a write operation corresponding to the first case (i), after completing the write operation on a relatively slow NVM, the storage device may inform the host device of completion (e.g., update a completion status). In this case, data may be transferred from the host device to the storage device through PCIe.

During a write operation corresponding to the second case (ii), after storing data only in the data buffer, the storage device may inform the host device of completion. Afterwards, a write operation may be performed on the NVM.

During a write operation corresponding to the third case (iii), since data do not pass through an IO stack and an IO interface, once data is copied from the host memory 120 to the HMB 124, the storage device may instantly inform the host device of completion. This means that the completion of the third case (iii) is made relatively rapidly compared with the completion of the first and second cases (i) and (ii).

Figure 3:
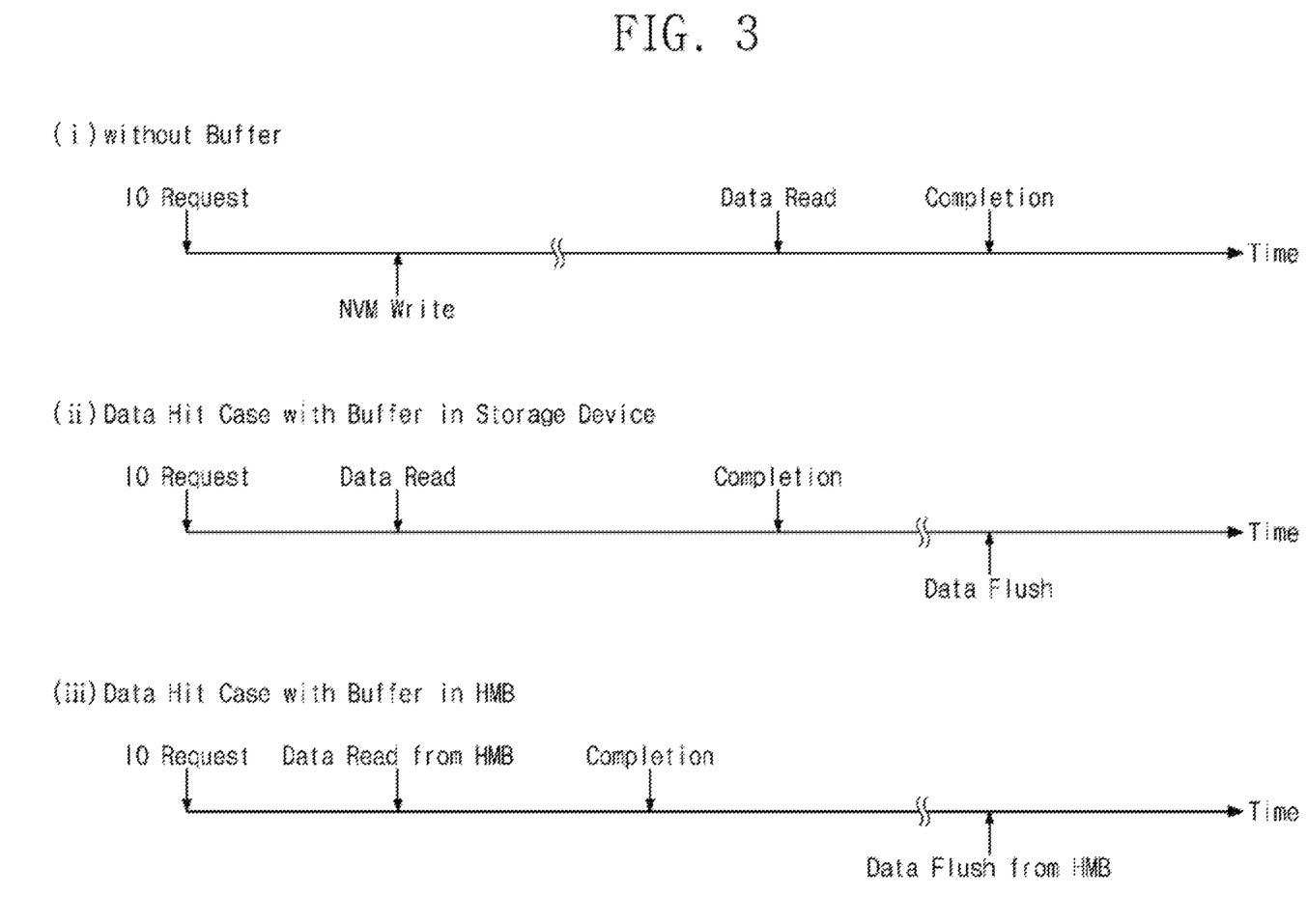
FIG. 3 is a diagram illustrating points in time when completion is made between the host device and the storage device during a read operation.

FIG. 3 is a diagram illustrating points in time when completion is made between a host device and a storage device during a read operation.

In a first case (i) where a data buffer does not exist, a storage device may inform a host device of completion after the storage device reads data from an NVM and transfers the read data to the host device through PCIe.

In a second case (ii) where a data buffer exists in a storage device, it is assumed that the data request by the read operation is present in the data buffer (i.e., a data hit). In this case, after the storage device reads the corresponding data from the data buffer and transfers the read data to the host device, the storage device may inform the host device of completion. Afterwards, data may be flushed from the data buffer of the storage device.

In a third case (iii) where a data buffer exists in the HMB 124, it is assumed that the data requested by the read operation is present in the data buffer of the HMB 124 (i.e., a data hit). In this case, after the storage device reads data existing in the data buffer of the HMB 124 and copies the read data to the host memory 120, the storage device may inform the host device of completion. Afterwards, data may be flushed from the data buffer. A response speed when a data hit occurs in the data buffer during a read operation may be higher than the response speed when data is read from an NVM.

Figure 4:
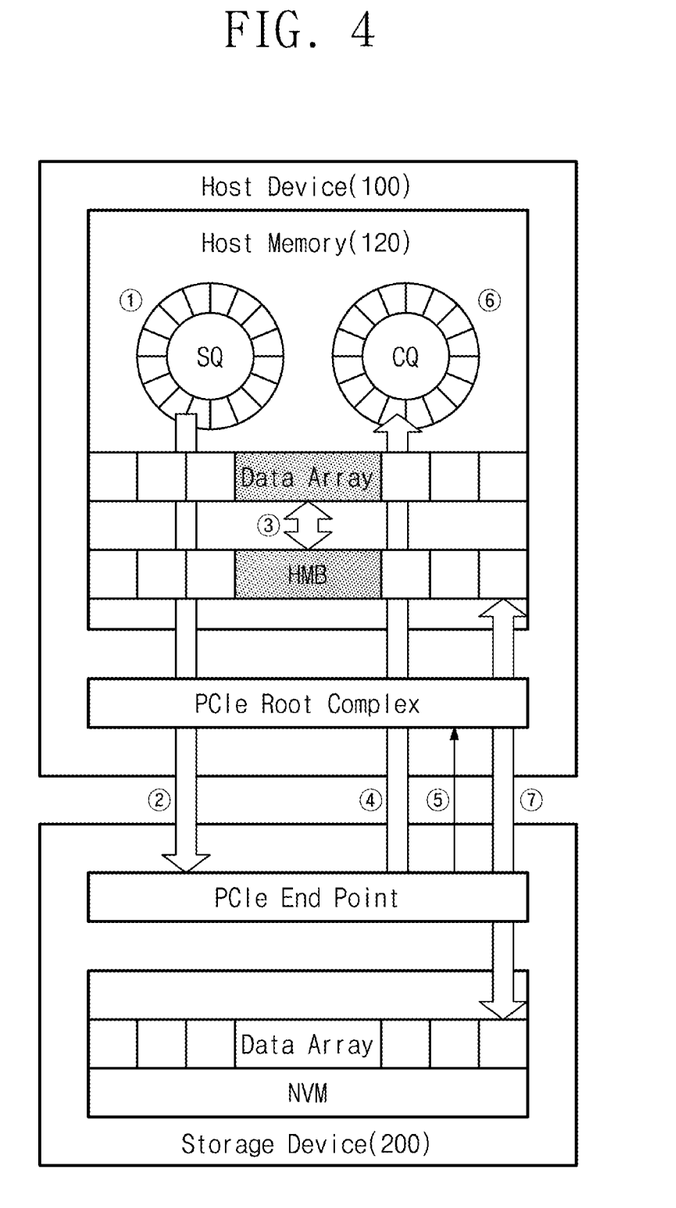
FIG. 4 is a diagram illustrating a process of processing commands, according to an exemplary embodiment.

FIG. 4 is a diagram illustrating a process of processing commands, according to an exemplary embodiment. How commands are processed will be described with reference to FIG. 4.

The host device 100 may store a command entry in a submission queue based on an input/output request (a write/read request) and may transfer a ring doorbell to the storage device (①). Afterwards, the storage device 200 may fetch a command entry from the host memory 120 (②).

If a command is a write command, data stored in the data array 122 of the host memory 120 may be copied to the HMB 124 with reference to a physical region page (PRP) of the command entry. In the case where the command is a read command, if an address corresponding to the read command is a hit in the HMB 124, data stored in the HMB 124 may be copied to the data array 122 of the host memory 120. As described above, a data copy operation may be performed between the data array 122 of the host memory 120 and the HMB 124 of the host memory 120 in response to the write request or the read request (③).

If the above-described data copy operation is completed, the storage device 200 may transfer a completion (e.g., completion notification), which indicates that a write/read operation is completed, to the host device 100 (④). Afterwards, the storage device 200 may transfer an interrupt to the host device 100. Here, the interrupt may be a message signaled interrupt (MSI)/MSI-X (⑤). Afterwards, the host device 100 may update the completion queue and may transfer a ring doorbell to the storage device 200 (⑥). Finally, the host device 100 may process the input/output request as being completed.

Afterwards, during an idle time (e.g., when the host device 100 and/or the storage device 200 are not processing other data) or when a situation of the storage device 200 permits, data stored in the HMB 124 may be written back to the storage device 200. Frequently used data may be pre-fetched to the data cache area 124-2 of the HMB 124 (⑦). As such, performance of read throughput may be improved.

Figure 5:
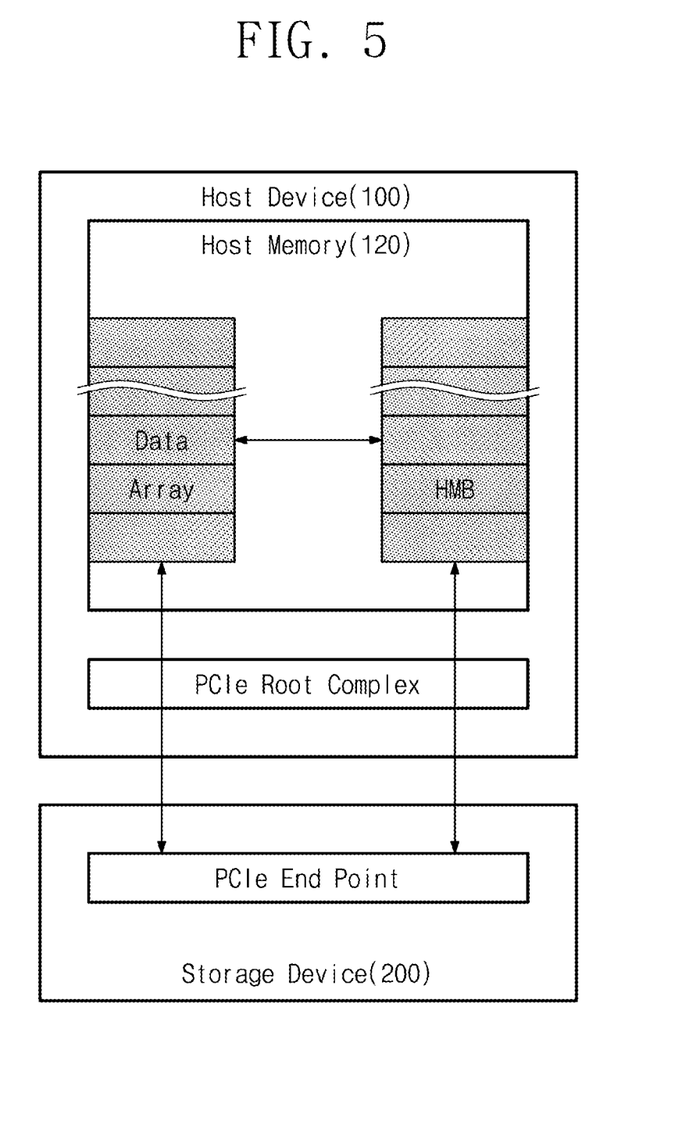
FIG. 5 is a diagram illustrating data paths in the computing system, according to an exemplary embodiment.

FIG. 5 is a diagram illustrating data paths in the computing system 10, according to an exemplary embodiment. The host device 100 and the storage device 200 that communicate with each other based on a PCIe interface are illustrated in FIG. 5. However, the exemplary embodiments are not limited thereto.

Referring to FIG. 5, a first data path may exist between the data array 122 of the host memory 120 and the storage device 200, a second data path may exist between the HMB 124 and the storage device 200, and a third data path that may be an internal data path may exist between the data array 122 of the host memory 120 and the HMB 124.

Conventionally, data may be moved between the data array 122 and the HMB 124 through the PCIe interface. However, according to an aspect of an exemplary embodiment, it may be possible to move data between the data array 122 and the HMB 124 through the third data path, which is an internal data path.

According to an aspect of an exemplary embodiment, the computing system 10 may reduce a latency occurring while passing through a system bus, a northbridge, a southbridge, and a PCIe switch, thereby markedly improving a queue depth latency. Also, with regard to a multi-queue depth, since data are transferred with a system bandwidth that is larger than a PCIe bandwidth, data throughput may increase. This may mean that input/output operations per second (IOPS) may also increase.

Figure 6:
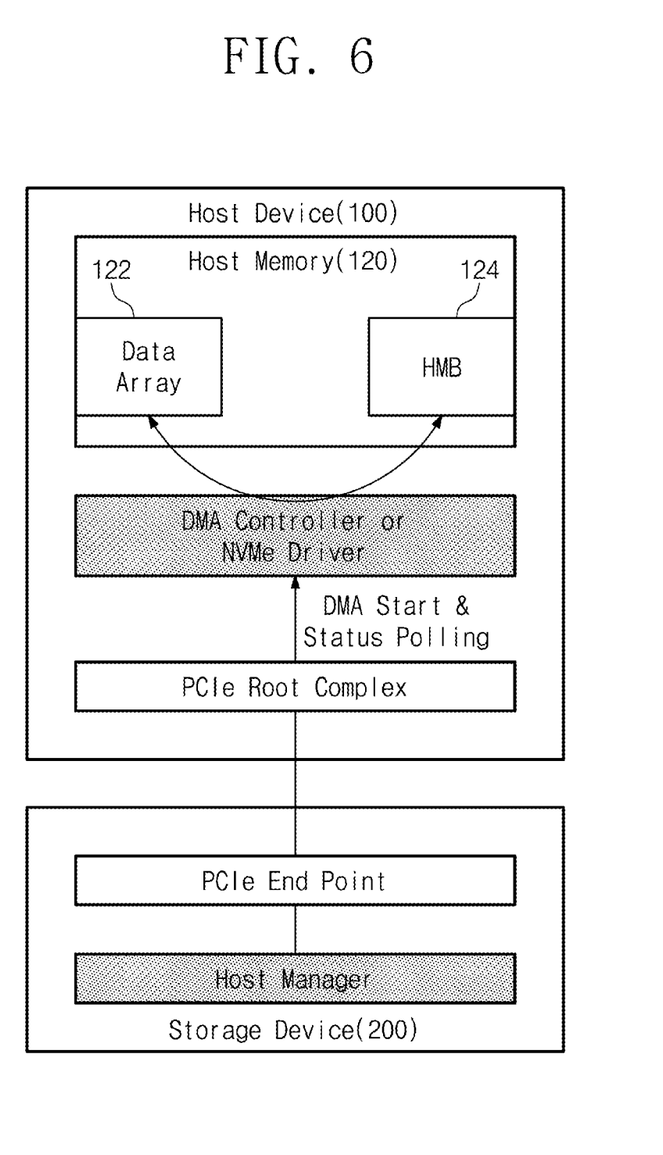
FIG. 6 is a diagram illustrating a method of moving data between a data array and a host memory buffer (HMB) of a host memory in the computing system, according to an exemplary embodiment.

FIG. 6 is a diagram illustrating a method of moving data between the data array 122 and the HMB 124 of the host memory 120 in the computing system 10, according to an exemplary embodiment. Referring to FIG. 6, a data movement (e.g., transfer) operation in the host memory 120 may be performed by a DMA controller or a nonvolatile memory driver such as an NVMe driver.

First, the host device 100 may inform the storage device 200 of an address of a special function register (SFR) or a DMA descriptor for operating a DMA controller by using a vendor-specific command of NVMe commands or a reserved address of a base address register (BAR) address during an NVMe initialization operation. Afterwards, the storage device 200 may drive the DMA controller through the corresponding address for an I/O operation.

Second, when the host device 100 fails to allocate the DMA controller to the storage device 200, the storage device 200 may perform a memory copy operation instead of a function of the DMA controller.

Meanwhile, after a data movement operation by the DMA controller or the NVMe driver, in order to perform a next step of the command protocol, the storage device 200 needs to know whether the copy operation is completed.

The storage device 200, as illustrated in FIG. 6, may determine whether the copy operation is completed, by polling an SFR address of the DMA controller or a state address (e.g., a preset address) of the NVMe driver provided from the host device 100 during an initialization operation.

Meanwhile, the host device 100 may directly inform the storage device 200 that the data copy operation is completed.

Figure 7:
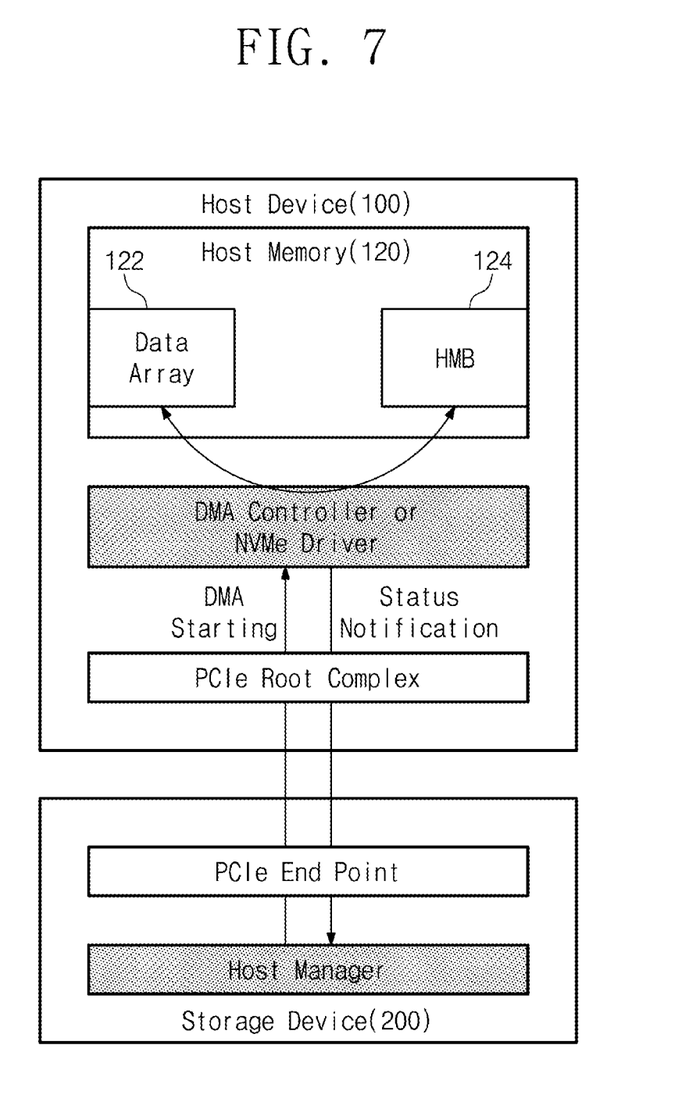
FIG. 7 is a diagram illustrating a method of moving data between the data array and the HMB of the host memory in the computing system, according to an exemplary embodiment.

FIG. 7 is a diagram illustrating a method of moving data between the data array 122 and the HMB 124 of the host memory 120 in the computing system 10, according to an exemplary embodiment. A data copy operation illustrated in FIG. 7 may differ from the data copy operation illustrated in FIG. 6 in that the host device 100 allows the storage device 200 to detect the completion of the copy operation by directly using a reserved BAR address or a vendor specific command.

Figure 8:
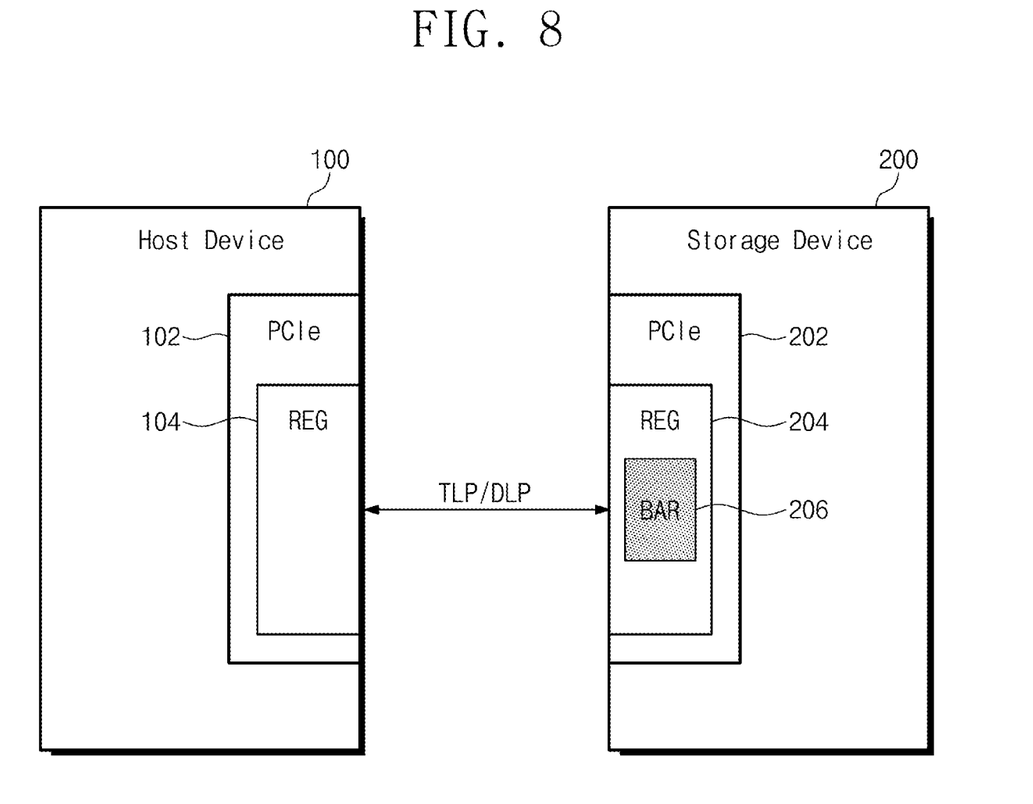
FIG. 8 is a diagram illustrating communications, which are associated with a memory copy operation, between the host device and the storage device in the computing system, according to an exemplary embodiment.

FIG. 8 is a diagram illustrating communications, which are associated with a memory copy operation, between the host device 100 and the storage device 200 in a computing system, according to an exemplary embodiment. Referring to FIG. 8, the host device 100 and the storage device 200 may communicate with each other through PCIe interfaces 102 and 202.

The PCIe interface 102 of the host device 100 may transfer a notification message to a register 204 of the PCIe interface 202 of the storage device 200 through a transport layer packet (TLP)/data link layer packet (DLP). For example, the notification message may be stored in a BAR area 206 of the register 204.

The PCIe interface 202 of the storage device 200 may send a data movement request (e.g., data transfer request) to a register 104 of the PCIe interface 102 of the host device 100 through TLP/DLP. Meanwhile, a computing system may be implemented to divide and manage a data cache area of a host memory.

Figure 9:
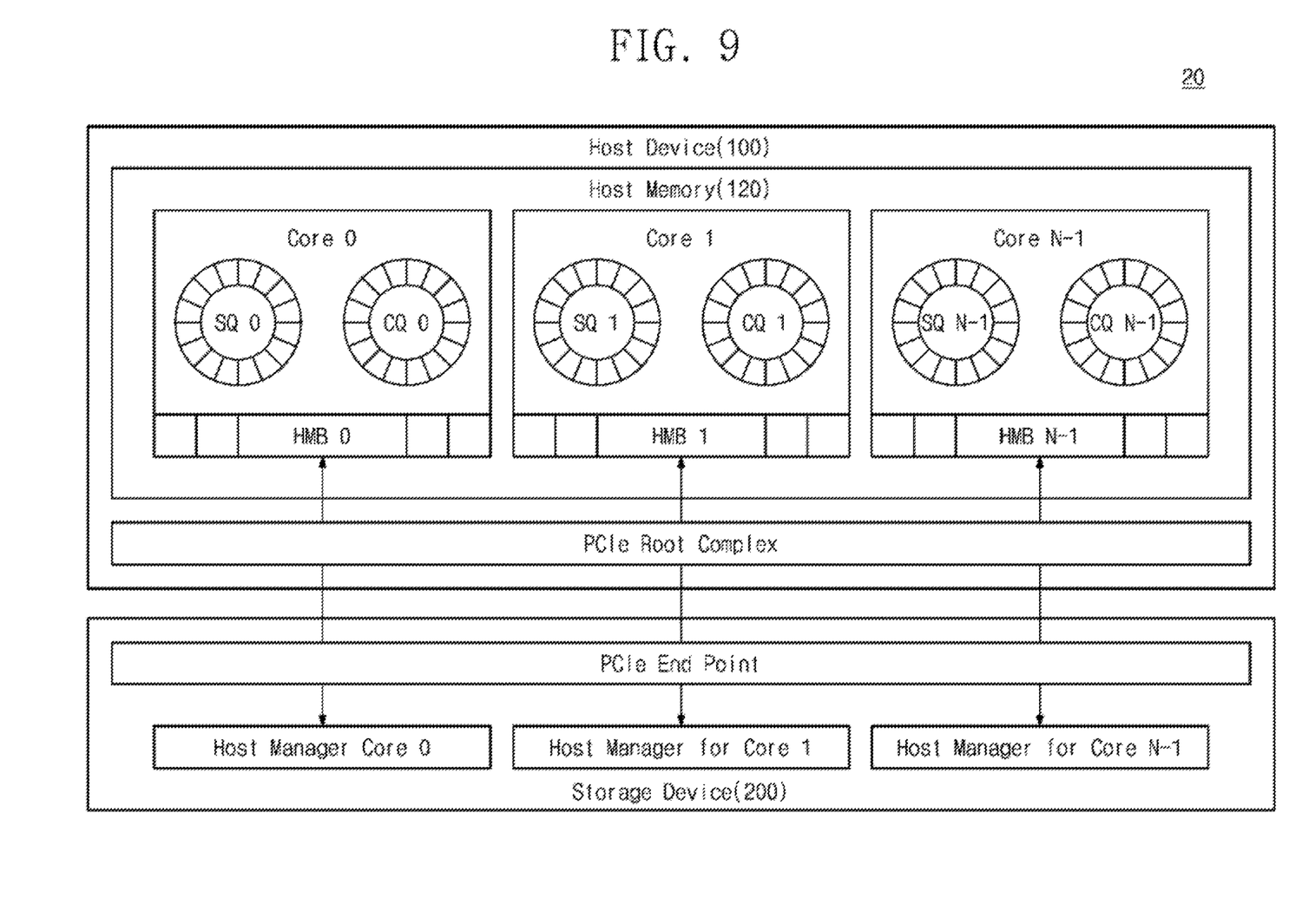
FIG. 9 is a diagram illustrating a computing system, according to an exemplary embodiment.

FIG. 9 is a diagram illustrating a computing system 20, according to an exemplary embodiment. Referring to FIG. 9, in consideration of a characteristic in which a queue is generated for each core of the NVMe, the computing system 20 may divide the HMB 124 into multiple HMB areas (e.g., a plurality of memory areas), one area per core or queue, and may manage cached data entries.

Figure 10:
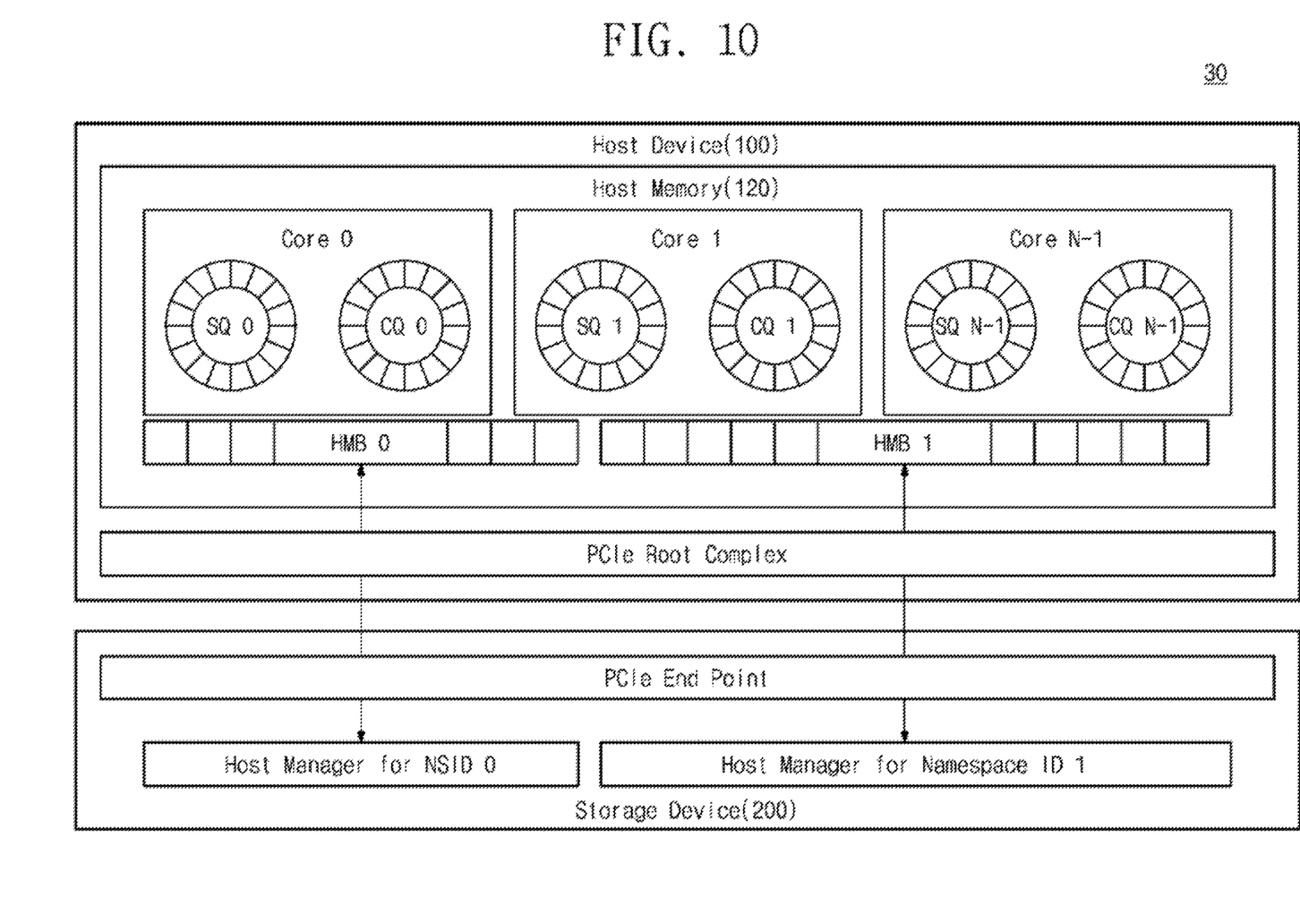
FIG. 10 is a diagram illustrating a computing system, according to an embodiment.

FIG. 10 is a diagram illustrating a computing system 30, according to an exemplary embodiment. Referring to FIG. 10, the computing system 30 may divide the HMB 124 for each name space and may manage cached data entries.

A storage device may analyze an IO request pattern and may determine whether to cache data in the HMB 124 or to transfer the data directly to a storage device. For example, data may be stored in the storage device when a user or an application writes logical block addresses (LBAs) of a large range or sequential LBAs in the HMB 124 cache.

Figure 11:
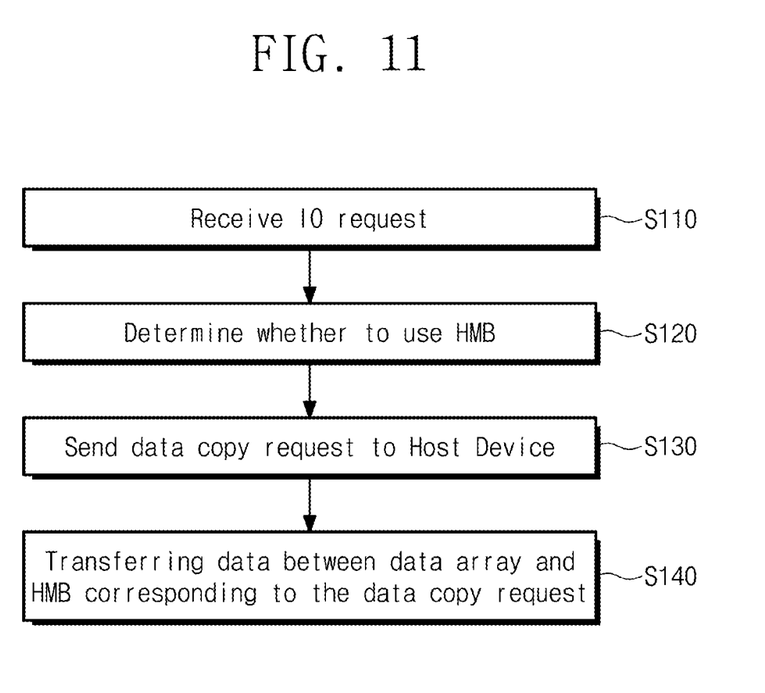
FIG. 11 is a flowchart illustrating an input/output operation method of a computing system, according to an exemplary embodiment.

FIG. 11 is a flowchart illustrating an input/output operation method of a computing system, according to an exemplary embodiment. An input/output operation of a computing system will be described with reference to FIGS. 1 to 11.

A storage device may receive an input/output request from a host device (S110). To process data based on the input/output request, the storage device may determine whether to use the HMB 124 (S120). For example, in the case that the data have large capacity (e.g., larger than a threshold capacity value) or the data correspond to sequential addresses, the storage device may not use the HMB 124 of the host memory.

If it is determined that the HMB 124 is to be used, the storage device may send a request for copying data between a data array and the HMB 124 of a host memory to the host device. Here, the data copy request may correspond to the input/output request (S130). Afterwards, data corresponding to the data copy request may be transferred between the data array and the HMB 124 of the host memory (S140). If data corresponding to the input/output request are completely transferred in the host memory, the input/output request may be completed.

Various embodiments of the present disclosure may be applicable to a mobile device.

Figure 12:
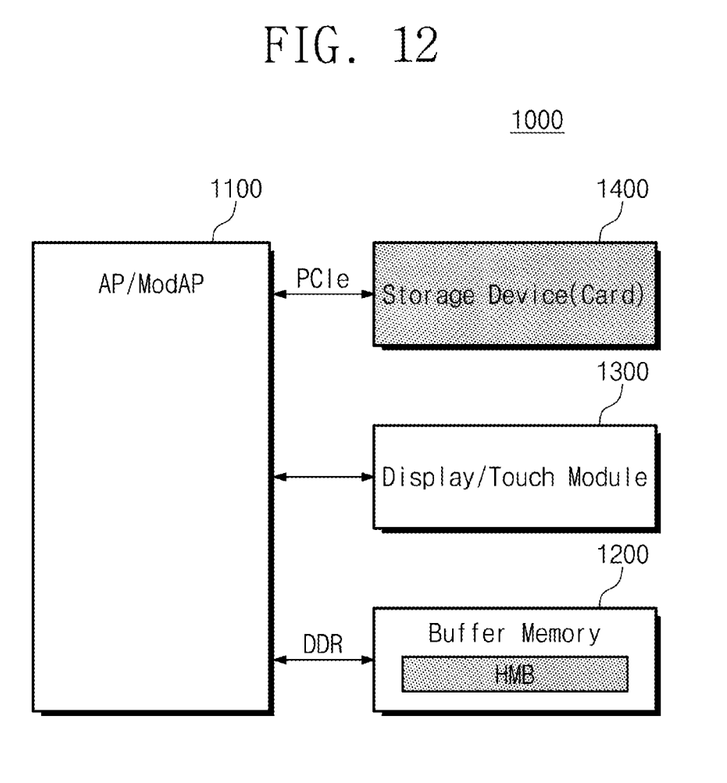
FIG. 12 is a diagram illustrating a mobile device, according to an exemplary embodiment.

FIG. 12 is a diagram illustrating a mobile device 1000, according to an exemplary embodiment. Referring to FIG. 12, the mobile device 1000 may include a processor (AP/ModAP) 1100, a buffer memory 1200, a display/touch module 1300, and a storage device 1400.

The processor 1100 may be implemented to control overall operations of the mobile device 1000 and wired/wireless communication with an external device. For example, the processor 1100 may be an application processor (AP), an integrated modem application processor (ModAP), etc.

The processor 1100 may include a security chip and access control logic. The security chip may be implemented with software and/or tamper resistant hardware, permit high-level security, and work in cooperation with a trusted execution environment (TEE) of the processor 1100. The security chip may include a Native operating system (OS), a security storage device that is internal data storage, an access control block that controls rights to access the secure chip, a security function block that performs ownership management, key management, digital signature, encryption/decryption, etc., and a firmware update block that updates firmware of the security chip. The security chip may be a universal integrated circuit card (UICC) (e.g., universal subscriber identification module (USIM), code division multiple access subscriber identification module (CSIM), and Internet protocol multimedia service identity module (ISIM)), a subscriber identity module (SIM) card, embedded secure elements (eSE), a microSD, a microchip sticker, etc. The access control logic may be implemented to control an access to an encryption data area of the buffer memory 1200.

The buffer memory 1200 may be implemented to temporarily store data, which are needed when the mobile device 1000 performs a process operation. The buffer memory 1200 may be implemented with a dynamic random access memory (DRAM), a synchronous DRAM (SDRAM), a magnetic RAM (MRAM), etc. The buffer memory 1200 may include a non-encryption data area and the encryption data area. Here, the encryption data area may store data that are encrypted by the security chip. The buffer memory 1200 may be connected to the processor 1100 through a double data rate (DDR) interface.

The buffer memory 1200 may include the above-described host memory buffer (HMB) 124. The storage device 1400 may independently/exclusively access the host memory buffer (HMB) 124 without intervention of the processor 1100. In other words, the storage device 1400 may have exclusive control over the host memory buffer (HMB) 124.

The display/touch module 1300 may be implemented to display data processed by the processor 1100 or to receive data from a touch panel.

The storage device 1400 may be implemented to store data of a user. The storage device 1400 may be an embedded multimedia card (eMMC), a solid-state drive (SSD), a universal flash storage (UFS), etc. The storage device 1400 may include at least one nonvolatile memory device. The storage device 1400 may be connected to the processor 1100 through the PCIe interface.

The mobile device 1000 according to an aspect of an exemplary embodiment may use the HMB 124 as a data cache of the storage device 1400, thereby improving the overall performance.

A storage system may use a host memory as a data buffer of a storage device while maintaining an interface protocol on a storage interface that allows the storage device to exclusively use the host memory. Here, the host memory may be used as a RAM cache before performing a write operation on an NVM of the storage device.

Data movement between a data area and an HMB area of the host memory may be performed by a DMA controller or an NVMe driver in the host device. Here, the storage device may request the host device to move data by the DMA controller or the NVMe driver.

The storage device may request data movement between the host memory and a system memory other than the host memory. For example, the storage device may make a request with respect to an SFR of the DMA controller or a designated address of the NVMe driver through a write/read operation. Also, the storage device may generate a data movement operation entry in the form of a descriptor and may transfer the data movement operation entry to the DMA controller or the NVMe driver.

The storage device may request data movement in the host memory by using an NVMe vendor-specific command or through a BAR area.

The data movement request may use PCIe transport layer packets (TLP) or data link layer packets (DLP).

Completion of data movement in the host memory may be checked (e.g., monitored, detected) by the storage device through polling according to the interface specification or may be informed with regard to the storage device by the host device.

A data movement state between the host memory and the system memory (other than the host memory) may be known through the polling of the storage device or may be informed with regard to the storage device by a notification of the host device.

The host device may inform the storage device of the data movement state by using the NVMe vendor-specific command or the BAR area. In this case, the notification message may use the PCIe TLP or DLP.

According to an aspect of an exemplary embodiment, an operating method of a computing system may divide a host memory for each core or queue and may allocate a RAM cache for each core or queue.

The operating method may divide the host memory for each name space or partition of the storage device and may independently allocate the RAM cache.

In the case of writing back or flushing data of the host memory to the storage device, the storage device may perform a write operation on an internal NVM or a data buffer in the storage device.

A host memory manager of the storage device may prefetch data stored in the NVM to the host memory in advance.

Data prefetch may be determined by using a prefetch prediction technique such as a request retrieval, a spatial locality, a temporal locality, Least Recently Used (LRU), etc.

The storage device may check a pattern of an input/output request and may determine whether to store data in a cache of the host memory or to fetch data to the storage device.

A computing system and an operating method thereof may issue completion immediately after performing a data movement operation in a host memory in response to an input/output request, thereby improving input/output performance.

While various exemplary embodiments have been described, it will be apparent to those skilled in the art that various changes and modifications may be made without departing from the spirit and scope of the present disclosure. Therefore, it should be understood that the above exemplary embodiments are not limiting, but illustrative.

What is claimed is:

1. An operating method of a computing system, the operating method comprising:
   sending, from a host device including a memory sub-system, a plurality of Input/Output (I/O) requests through a peripheral component interconnect express (PCIe) root complex;
   storing, in a submission queue of the host device, command entries corresponding to the plurality of I/O requests, respectively;
   fetching a command entry corresponding to an I/O request, among the plurality of I/O requests, from the submission queue, by a storage device coupled to the host device;
   moving data corresponding to the I/O request within the memory sub-system, under control of the storage device;
   after the moving the data within the memory sub-system, updating a completion status of the I/O request in a completion queue, as the I/O request being completed; and
   after the updating the completion queue, transferring the data between the memory sub-system and the storage device,
   wherein the memory sub-system includes a data array used by the host device, and a host memory buffer used by the storage device, and
   wherein the moving the data further comprises moving the data between the data array and the host memory buffer based on a data movement request of the storage device.

2. The operating method of claim 1, wherein the moving the data further comprises:
   moving the data between the data array and the host memory buffer by one from among a direct memory access controller and a nonvolatile memory driver, of the memory, sub-system, the one from among the direct memory access controller and the nonvolatile memory driver being controlled by the storage device.

3. The operating method of claim 2, wherein the moving the data further comprises:
   sending, from the storage device, the data movement request to the host device through at least one from among a read operation and a write operation at a preset address of a special function register of the direct memory access controller or a preset address of the nonvolatile memory driver.

4. The operating method of claim 2, wherein the moving the data further comprises:
   generating, at the storage device, a data movement operation entry corresponding to the data movement request as a descriptor; and
   transferring the data movement operation entry to the one from among the direct memory access controller and the nonvolatile memory driver.

5. The operating method of claim 2, wherein the moving the data further comprises:
   informing, by the host device, the storage device of one from among a first preset address of a special function register of the direct memory access controller and a second preset address of the nonvolatile memory driver through one from among a vendor-specific command and a base address register (BAR) address; and
   sending the data movement request to the host device by using the one from among the first preset address and the second preset address.

6. The operating method of claim 2, wherein the data movement request is sent from the storage device to the host device through one from among transport layer packets (TLP) and data link layer packets (DLP) that comply with a PCIe interface.

7. The operating method of claim 5, further comprising: checking, at the storage device, whether the moving the data is completed, by polling the one from among the first preset address and the second preset address.

8. The operating method of claim 1, further comprising: transferring, by the host device, a completion notification of the moving the data to the storage device.

9. The operating method of claim 1, further comprising:
   dividing the memory sub-system into a plurality of memory areas based on one from among a core and a queue; and
   using the plurality of memory areas as a random access memory (RAM) cache of the storage device.

10. The operating method of claim 1, further comprising:
    dividing the memory sub-system into a plurality of memory areas based on one from among a name space and a partition; and using the plurality of memory areas as a random access memory (RAM) cache of the storage device.

11. The operating method of claim 1, further comprising: determining, at the storage device, whether to use the memory sub-system as a random access memory (RAM) cache based on a pattern of the data corresponding to the I/O request.

12. A computing system comprising:
a host device configured to send a plurality of Input/Output (I/O) requests through a peripheral component interconnect express (PCIe) root complex and comprising a memory sub-system configured to store, in a submission queue, command entries corresponding to the plurality of I/O requests, respectively; and
a storage device connected to the host device, the storage device comprising at least one nonvolatile memory device and a memory controller configured to control the at least one nonvolatile memory device,
wherein the memory sub-system comprises:
a data array used by the host device, and
a host memory buffer used by the storage device,
wherein the host memory buffer comprises:
a metadata area that stores metadata for managing the storage device, and
a data cache area that temporarily stores data corresponding to the plurality of I/O requests,
wherein the storage device is further configured to:
fetch a command entry corresponding to an I/O request, among the plurality of I/O requests, from the submission queue; and
send, to the host device, a data movement request between the data array and the data cache area based on the I/O request,
wherein the host device is further configured to transfer the data between the data array and the data cache area based on the data movement request of the storage device, and
wherein the storage device is further configured to update a completion status of the I/O request, as the I/O request being completed, after the transferring the data.

13. The computing system of claim 12, wherein the I/O request comprises a write command,
wherein the host device is further configured to copy the data corresponding to the write command from the data array to the data cache area based on the data movement request,
wherein the storage device is further configured to update the completion status of the write command in the host device based on the data copied from the data array to the data cache area, and
wherein, after the completion status is updated, the data of the data cache area is written to the storage device.

14. The computing system of claim 12, wherein the I/O request comprises a read command,
wherein the host device is further configured to, based on an address corresponding to the read command being a hit in the data cache area, copy the data corresponding to the read command from the data cache area to the data array based on the data movement request,
wherein the storage device is further configured to update the completion status of the read command in the host device based on the data copied from the data cache area to the data array, and
wherein, after the completion status is updated, the data of the storage device is transferred to the data cache area.

15. The computing system of claim 12, wherein the data movement request is sent to the host device through one from among transport layer packets (TLP) and data link layer packets (DLP) that comply with a PCIe interface.

16. A method comprising:
sending, from a host device including a memory sub-system, a plurality of Input/Output (I/O) requests through a peripheral component interconnect express (PCIe) root complex;
storing, in a submission queue of the host device, command entries corresponding to the plurality of I/O requests, respectively;
fetching a command entry corresponding to an I/O request, among the plurality of I/O requests, from the submission queue, by a storage device coupled to the host device;
based on the command entry being a write command for storing a first data in the storage device, copying the first data from a data array of the memory sub-system to a host memory buffer of the memory sub-system, based on a data movement request of the storage device;
after the copying the first data from the data array to the host memory buffer, sending a first completion notification from the storage device to the host device, the first completion notification indicating that the write command is completed; and
after the sending the first completion notification, copying the first data from the host memory buffer to the storage device,
wherein the data array of the memory sub-system is used by the host device and the host memory buffer of the memory sub-system is used by the storage device.

17. The method of claim 16, wherein the storage device is a nonvolatile memory device.

18. The method of claim 17, wherein the copying the first data from the host memory buffer to the storage device further comprises:
copying the first data from the host memory buffer to the storage device during an idle time of at least one from among the host device and the storage device.

19. The method of claim 17, further comprising:
receiving, at the host device, a read command for reading a second data from the storage device;
based on the second data being present in the host memory buffer, copying the second data from the host memory buffer to the data array; and
after the copying the second data from the host memory buffer to the data array, sending a second completion notification from the storage device to the host device.

* * * * *